July 11, 1944.  F. J. MAYWALD, JR  2,353,256
MACHINE AND METHOD FOR MAKING CERTAIN RUBBER GOODS
Filed April 14, 1943   15 Sheets-Sheet 1
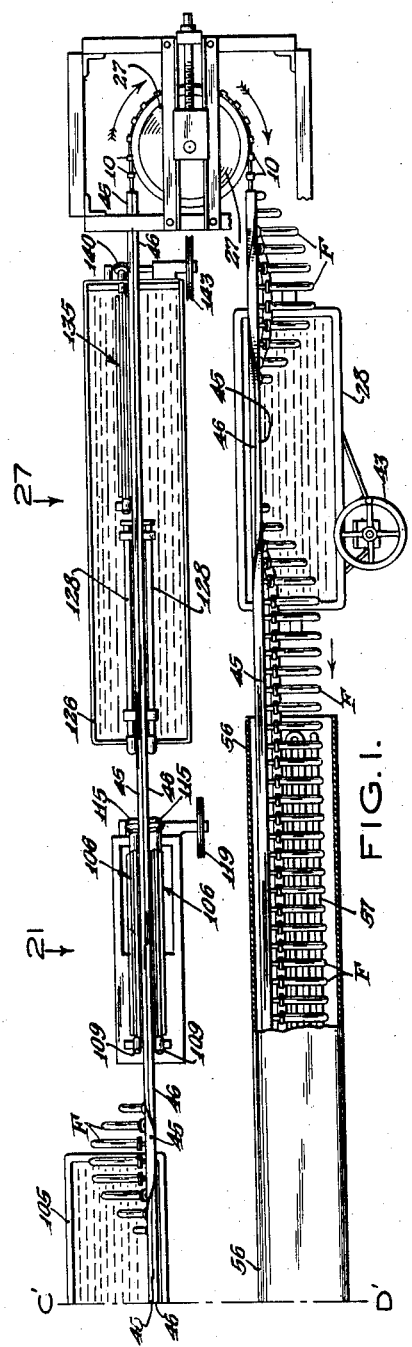
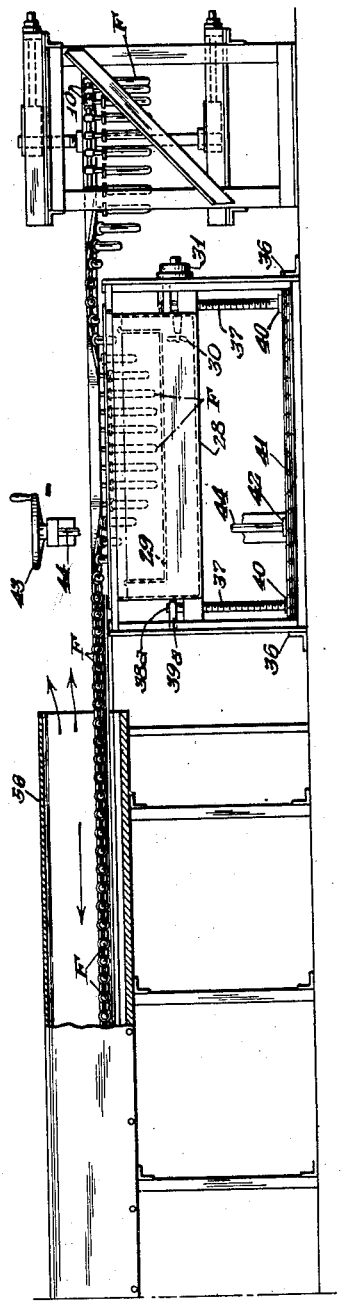
INVENTOR.
Frederick J. Maywald, Jr.
BY Mock + Blum
ATTORNEYS July 11, 1944.　　F. J. MAYWALD, JR　　2,353,256
MACHINE AND METHOD FOR MAKING CERTAIN RUBBER GOODS
Filed April 14, 1943　　15 Sheets-Sheet 2
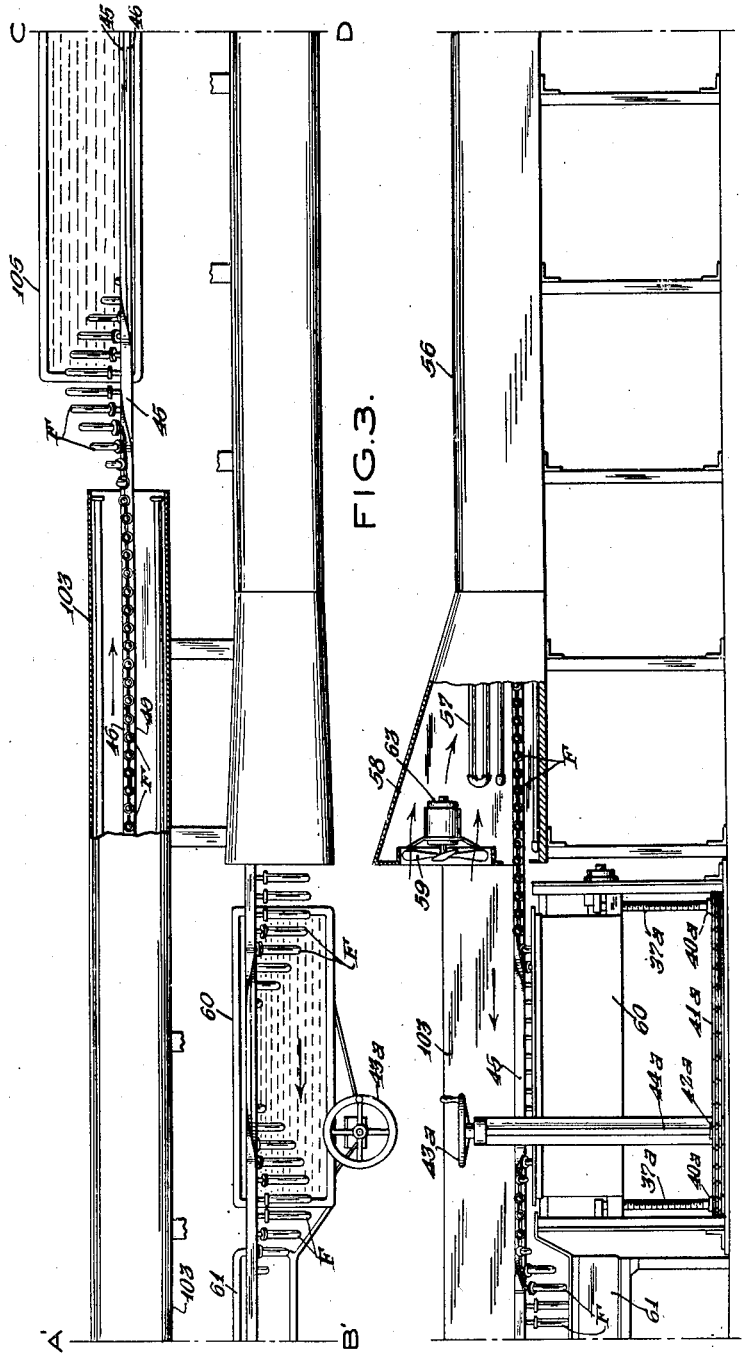
INVENTOR.
Frederick J. Maywald, Jr.
BY Mock + Blum
ATTORNEYS July 11, 1944. F. J. MAYWALD, JR 2,353,256
MACHINE AND METHOD FOR MAKING CERTAIN RUBBER GOODS
Filed April 14, 1943 15 Sheets-Sheet 3
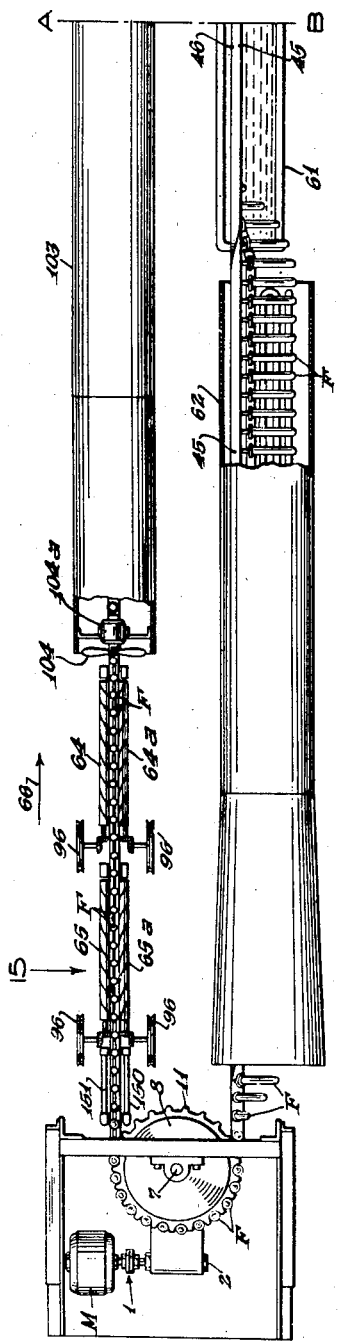
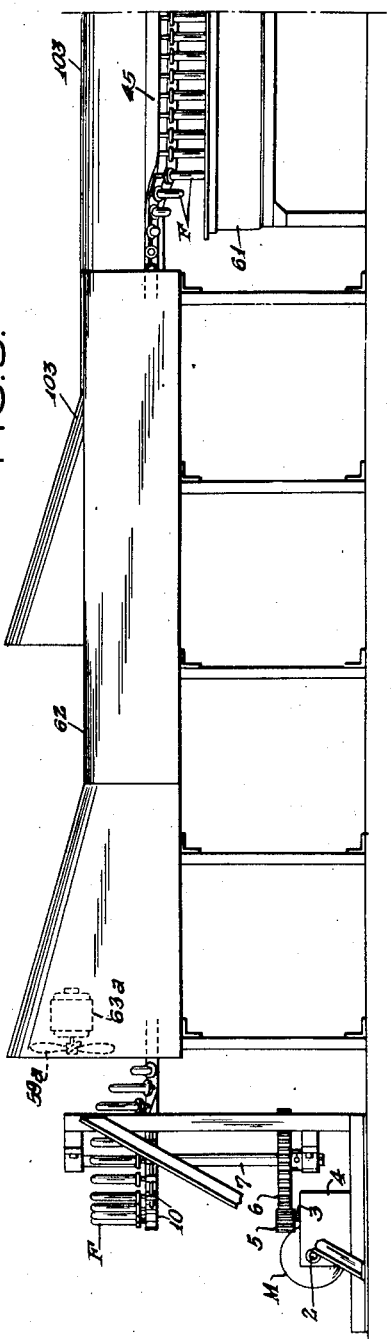
INVENTOR.
Frederick J. Maywald, Jr.
BY Mock + Blum
ATTORNEYS

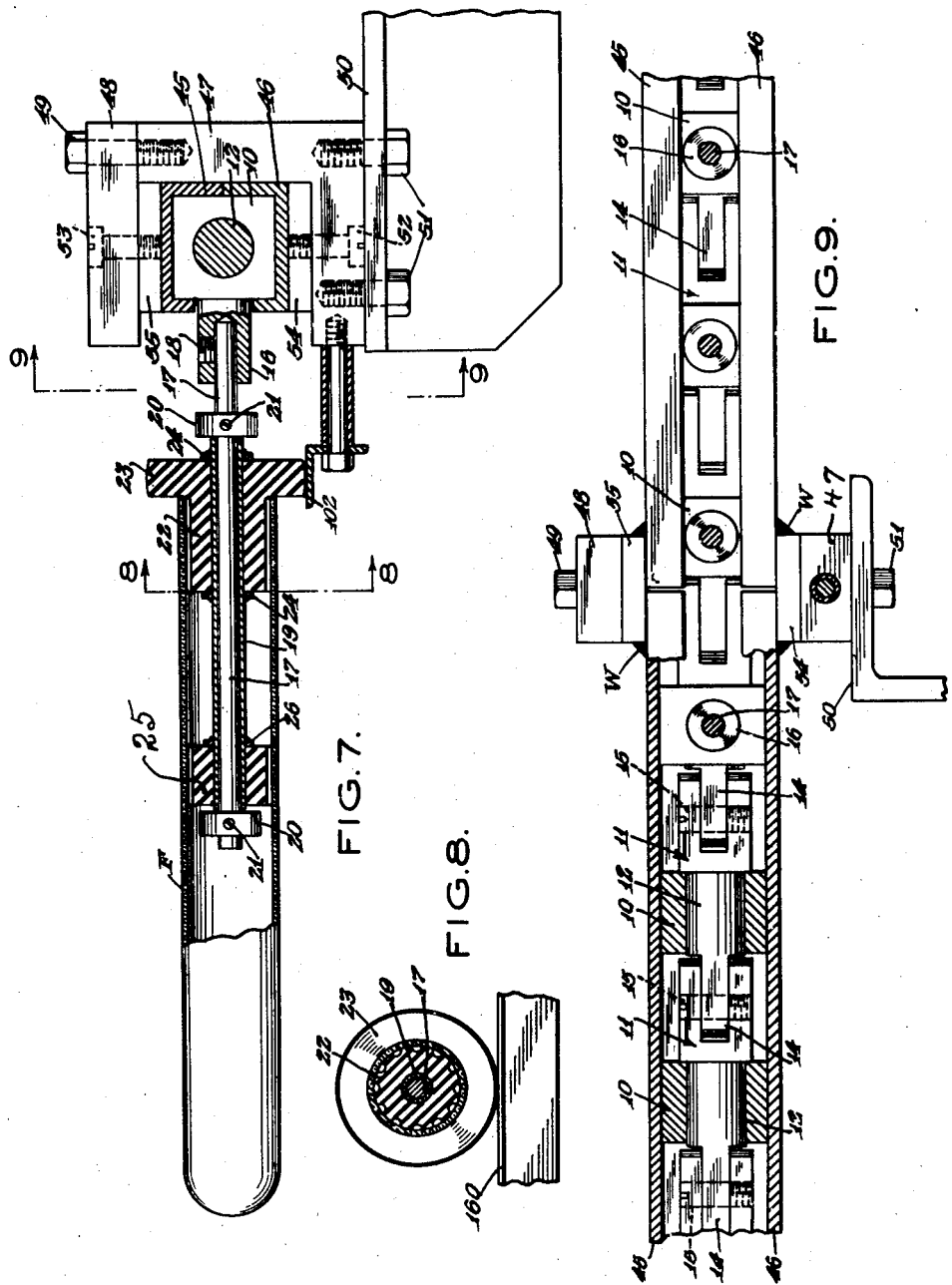

July 11, 1944.  F. J. MAYWALD, JR  2,353,256
MACHINE AND METHOD FOR MAKING CERTAIN RUBBER GOODS
Filed April 14, 1943    15 Sheets-Sheet 5
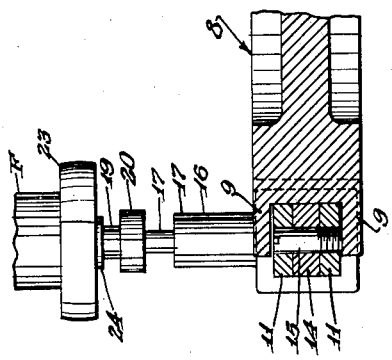
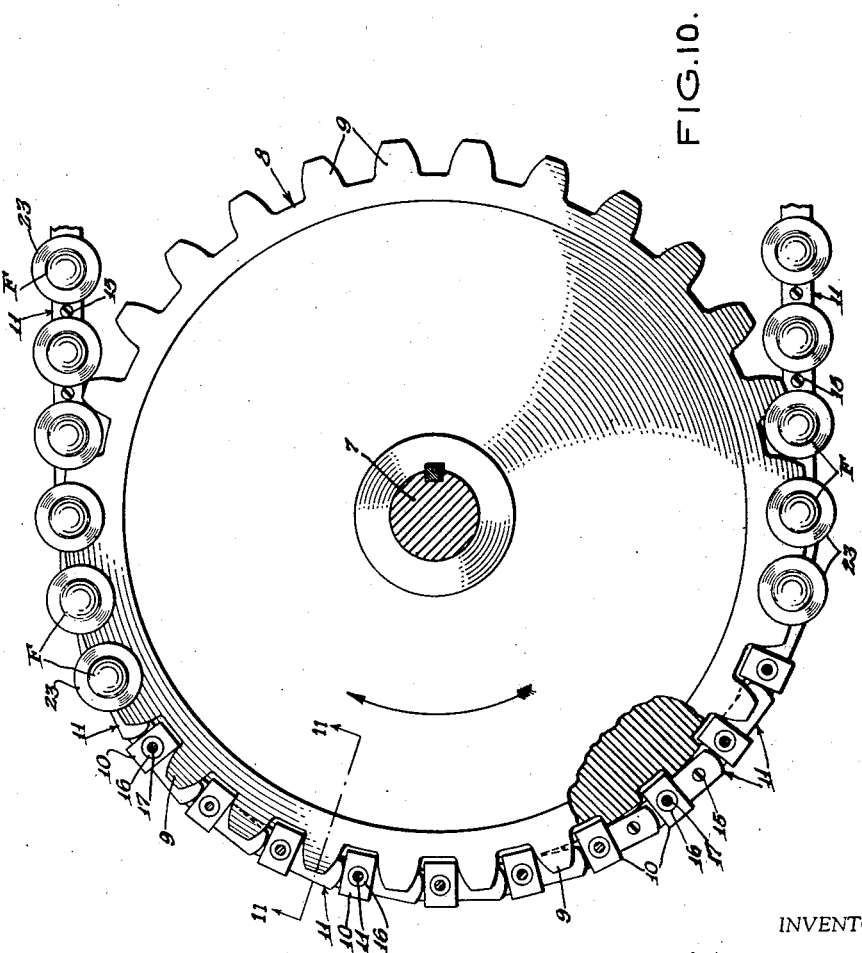
INVENTOR.
Frederick J. Maywald, Jr
BY Mock + Blum
ATTORNEYS

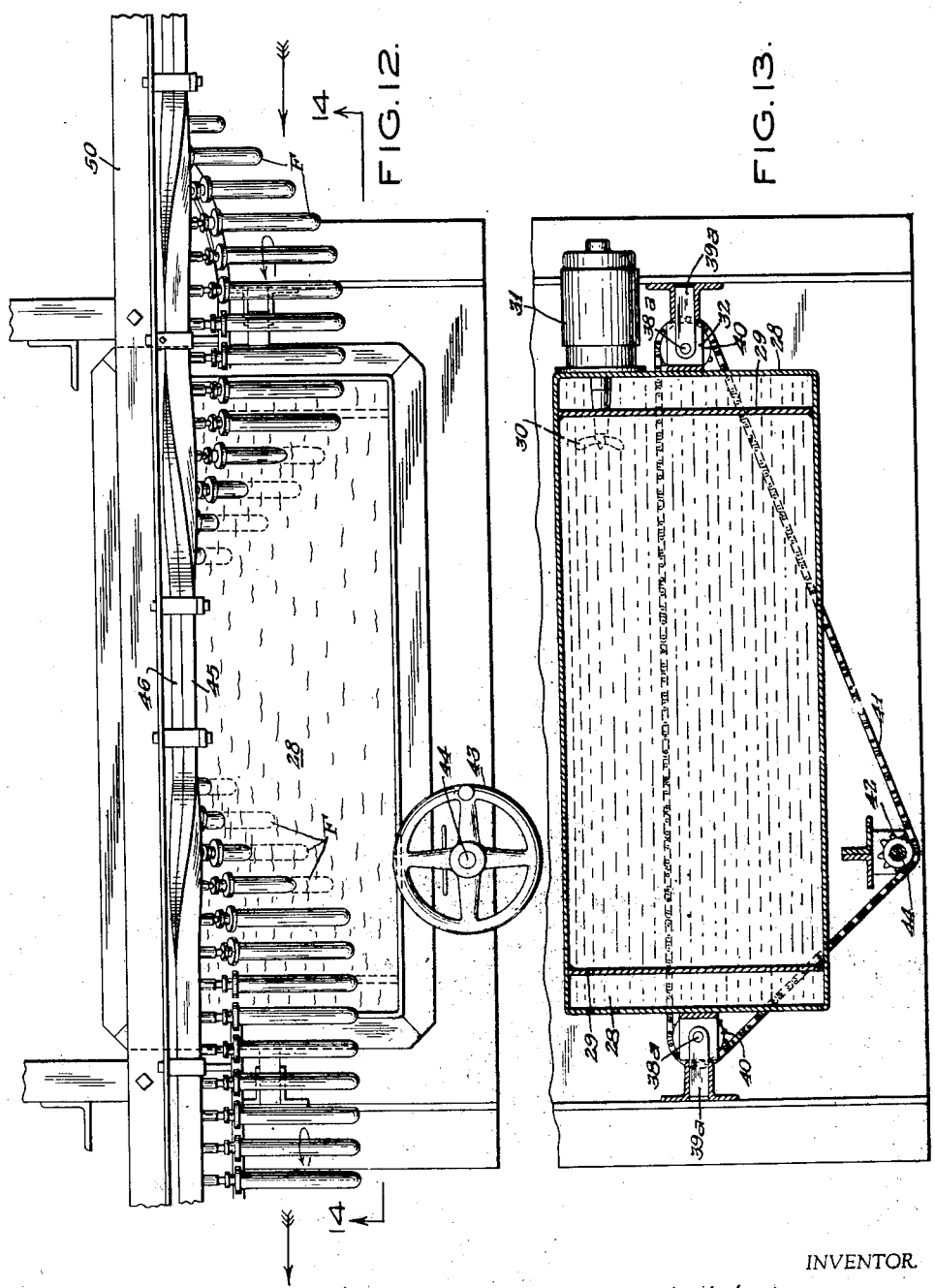

July 11, 1944.  F. J. MAYWALD, JR  2,353,256
MACHINE AND METHOD FOR MAKING CERTAIN RUBBER GOODS
Filed April 14, 1943  15 Sheets-Sheet 7

INVENTOR.
Frederick J. Maywald, Jr.
BY Mock + Blum
ATTORNEYS

July 11, 1944.  F. J. MAYWALD, JR  2,353,256
MACHINE AND METHOD FOR MAKING CERTAIN RUBBER GOODS
Filed April 14, 1943    15 Sheets-Sheet 9

INVENTOR.
Frederick J. Maywald, Jr.
BY Mock & Blum
ATTORNEYS

July 11, 1944. F. J. MAYWALD, JR 2,353,256
MACHINE AND METHOD FOR MAKING CERTAIN RUBBER GOODS
Filed April 14, 1943 15 Sheets-Sheet 10

INVENTOR.
Frederick J. Maywald, Jr.
BY
ATTORNEYS

July 11, 1944.  F. J. MAYWALD, JR  2,353,256
MACHINE AND METHOD FOR MAKING CERTAIN RUBBER GOODS
Filed April 14, 1943  15 Sheets-Sheet 11
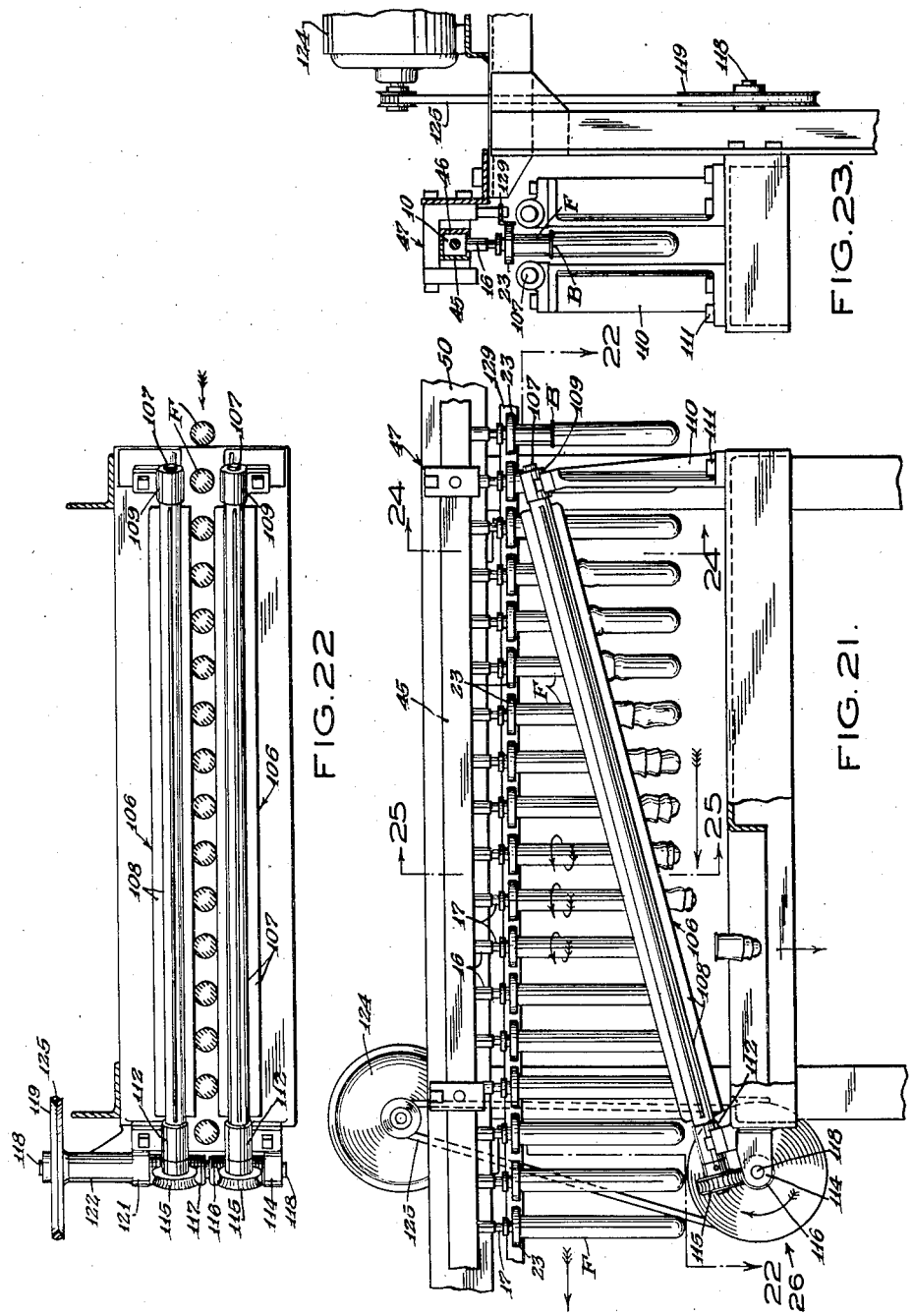
INVENTOR.
Frederick J. Maywald, Jr.
BY Mocko Blum
ATTORNEYS July 11, 1944. F. J. MAYWALD, JR 2,353,256
MACHINE AND METHOD FOR MAKING CERTAIN RUBBER GOODS
Filed April 14, 1943 15 Sheets-Sheet 12

INVENTOR.
BY Frederick J. Maywald, Jr.
Mock & Blum
ATTORNEYS

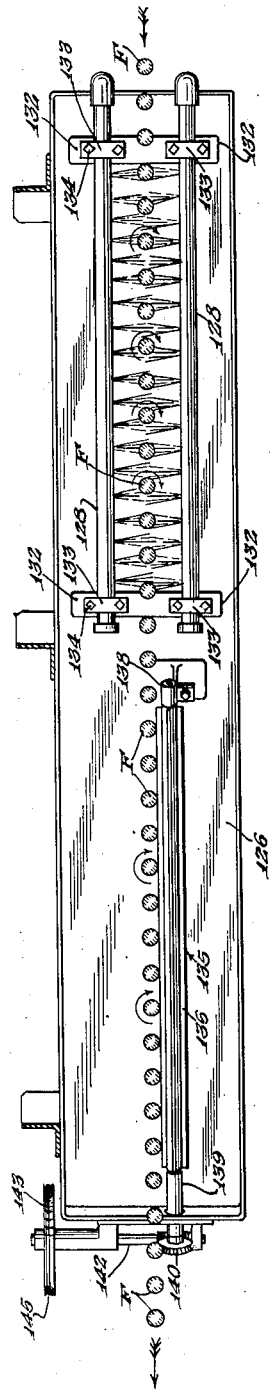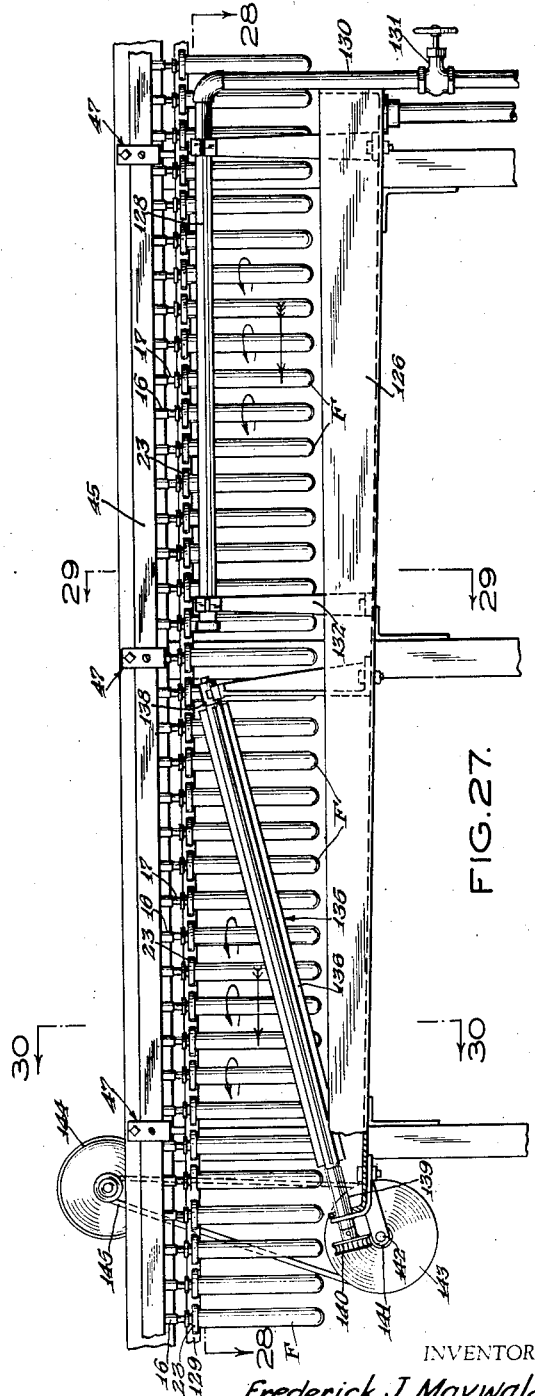

July 11, 1944.  F. J. MAYWALD, JR  2,353,256
MACHINE AND METHOD FOR MAKING CERTAIN RUBBER GOODS
Filed April 14, 1943  15 Sheets-Sheet 14
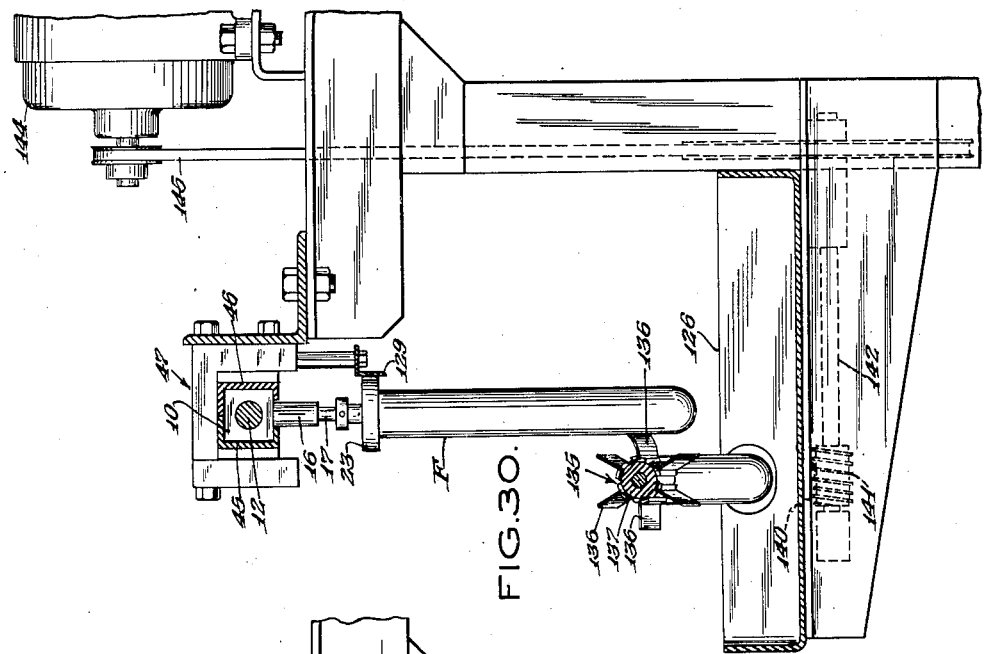
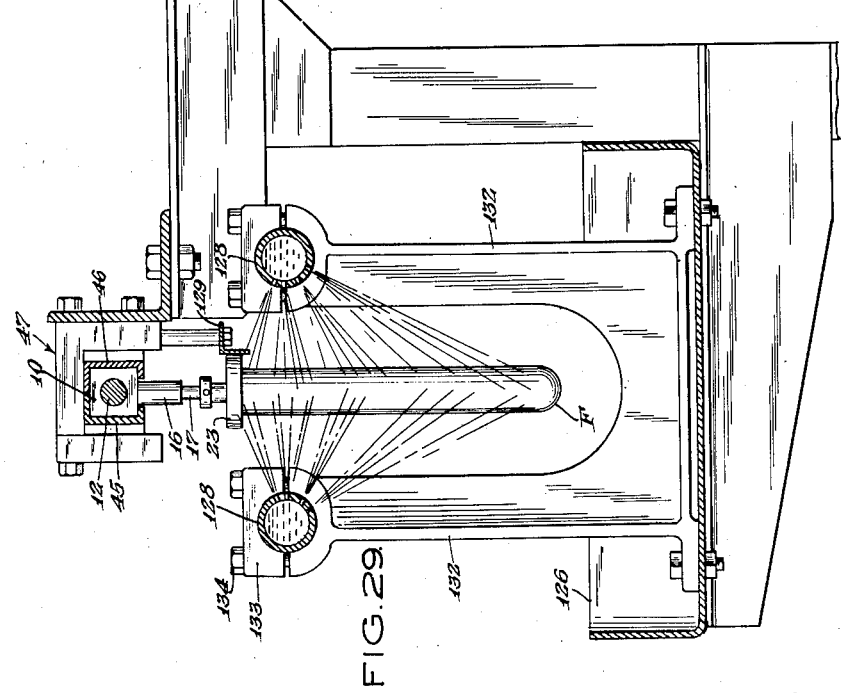
INVENTOR.
Frederick J. Maywald, Jr.
BY Mock & Blum
ATTORNEYS

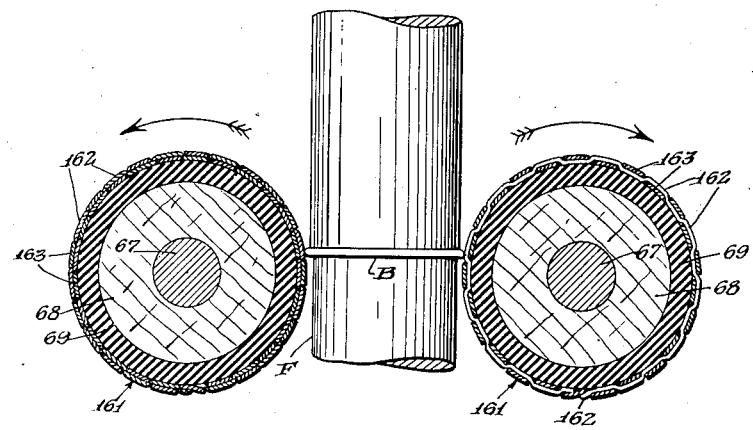
FIG. 31.
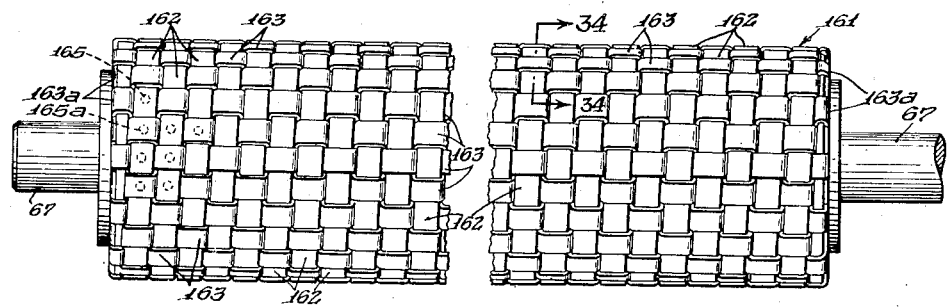
FIG. 32.
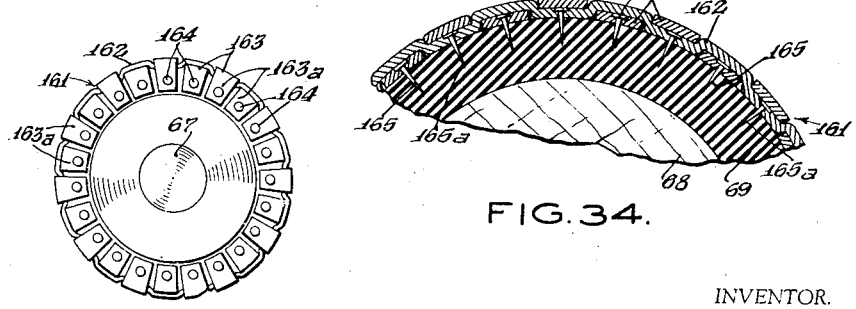
FIG. 33.
FIG. 34.
INVENTOR.
Frederick J. Maywald, Jr.
BY Mock & Blum
ATTORNEYS Patented July 11, 1944

2,353,256

UNITED STATES PATENT OFFICE

2,353,256

MACHINE AND METHOD FOR MAKING CERTAIN RUBBER GOODS

Frederick J. Maywald, Jr., Rutherford, N. J., assignor to Allied Latex Corporation, East Newark, N. J., a corporation of New Jersey Original application September 25, 1940, Serial No. 358,231. Divided and this application April 14, 1943, Serial No. 483,040

3 Claims. (Cl. 18—2)

My invention relates to a new and improved machine and method for making certain rubber goods, such as toy balloons, rubber gloves and the like.

One of the objects of the invention is to provide a simple and efficient machine, which has few parts, which will remain in order.

Another object of the invention is to provide a machine in which the forms are turnably connected to blocks which are connected to an endless conveyor, said machine having guide means which are shaped to automatically turn said blocks relative to the longitudinal axis of the conveyor, in order to maintain the forms upright, or inverted, or horizontal, or in any position between the upright and the inverted positions.

Another object of the invention is to provide a machine in which each form is provided with a single roller which turns in unison with the respective forms, thus eliminating idler rolls, and holding each form reliably with its axis parallel to a predetermined line, during the beading operation.

Another object of the invention is to moisten the end portions of the rubber objects which are subjected to the action of the beading mechanism, prior to the performance of the beading operation, in order to facilitate the proper and uniform operation of the beading devices.

Other objects of my invention will be set forth in the following description and drawings which illustrate certain preferred embodiments, it being understood that the above statement of the objects of my invention is intended to generally explain the same without limiting it in any manner.

Fig. 1 is a top plan view of the right-hand end of the improved machine. For convenience, the right-hand end of Fig. 1 may be designated as the front end of the machine.

Fig. 2 is a side view of Fig. 1.

Fig. 3 is a top plan view which is a continuation of Fig. 1, from right to left. The line C—D of Fig. 3 therefore corresponds to the line C'—D' of Fig. 1.

Fig. 4 is a top plan view of Fig. 3.

Fig. 5 is a top plan view which is a continuation of Fig. 3, so that the line A—B of Fig. 5 corresponds to the line A'—B' of Fig. 3.

Fig. 6 is a side elevation of Fig. 5.

Fig. 7 is a sectional view, partially in elevation, on the line 7—7 of Fig. 14.

Fig. 8 is a sectional view on the line 8—8 of Fig. 7.

Fig. 9 is a sectional view on the line 9—9 of Fig. 7.

Fig. 10 is an enlarged plan view, partially in section, of the driving sprocket which is shown at the left-hand side of Fig. 5.

Fig. 11 is a sectional view on the line 11—11 of Fig. 10.

Fig. 12 is an enlarged plan view of the first dipping tank, said tank being shown in Fig. 1.

Fig. 13 is a sectional view on the line 13—13 of Fig. 14.

Figure 15:
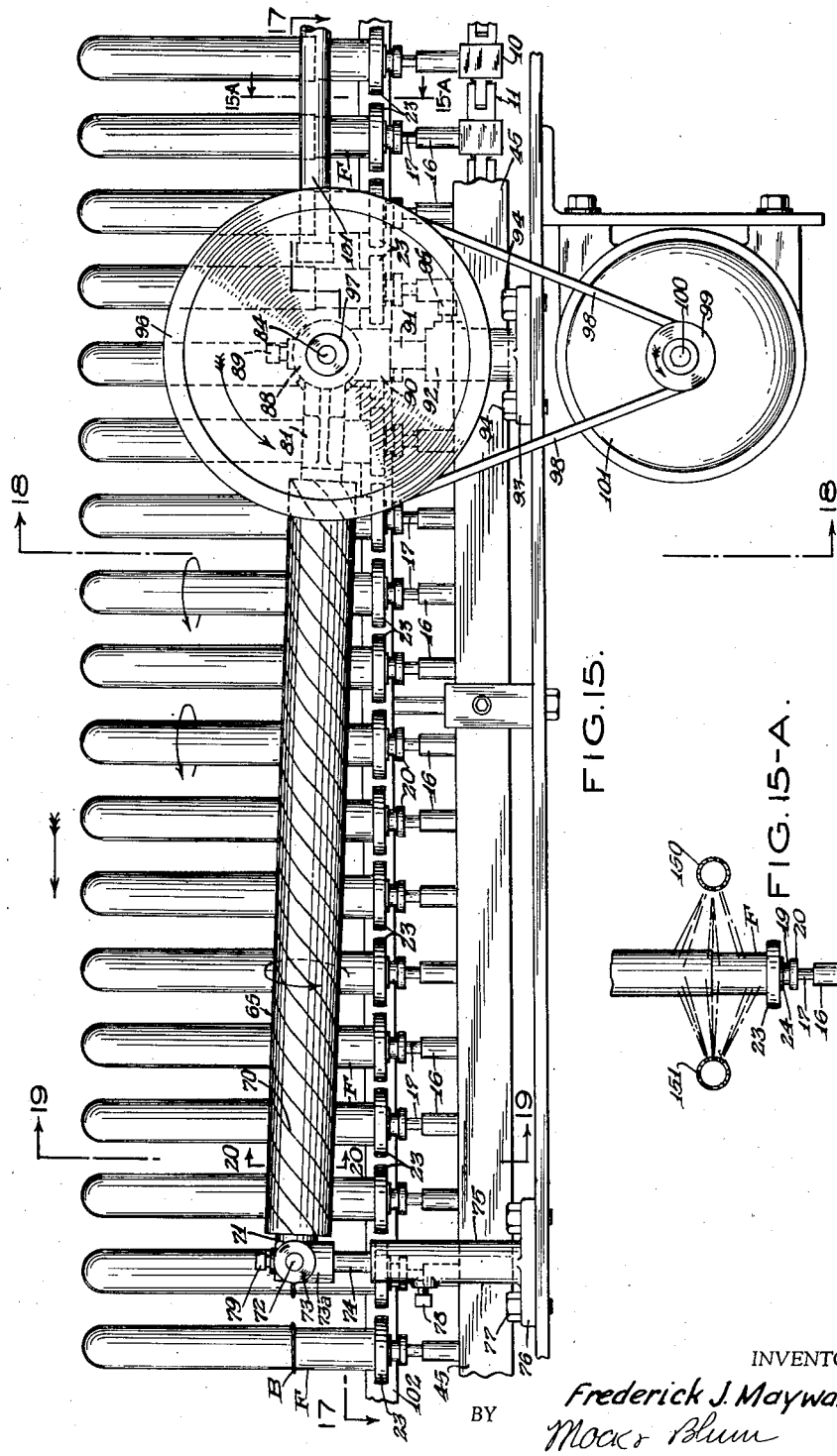
Fig. 15 is a side elevation of the beading mechanism, taken in the direction of the line which is designated by the reference numeral 15 in Fig. 5.

Fig. 15—A is a sectional view on line 15—A—15—A of Fig. 15.

Figures 16, 17:
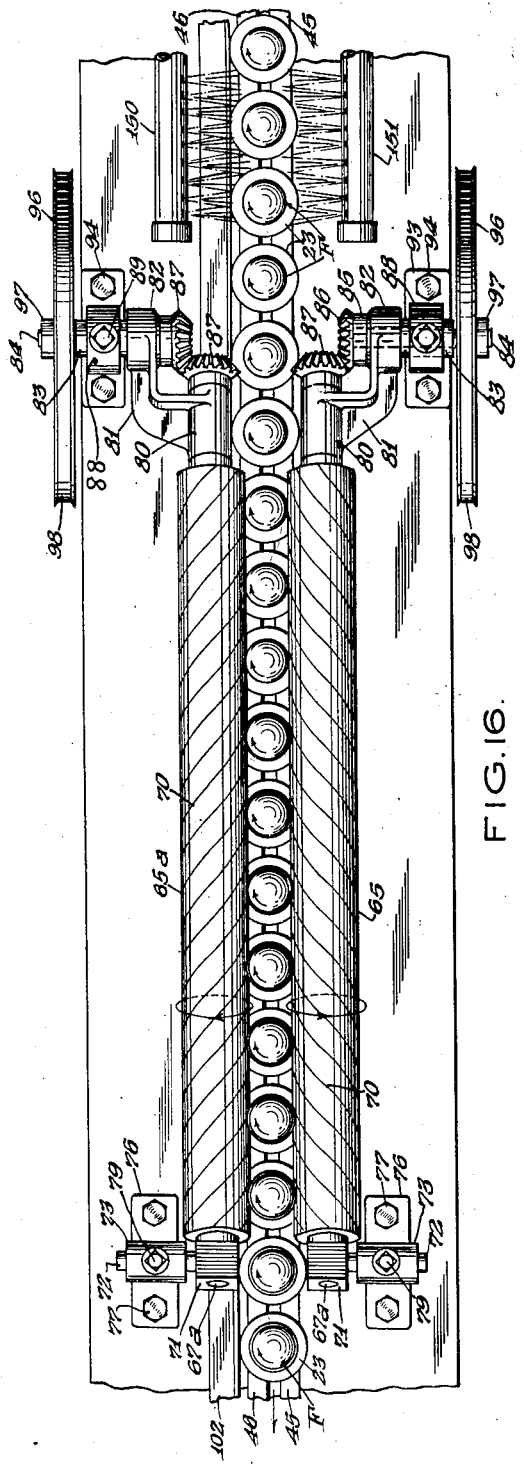

Fig. 16 is a plan view of Fig. 15.

Fig. 17 is a sectional view on the line 17—17 of Fig. 15.

Figure 18:
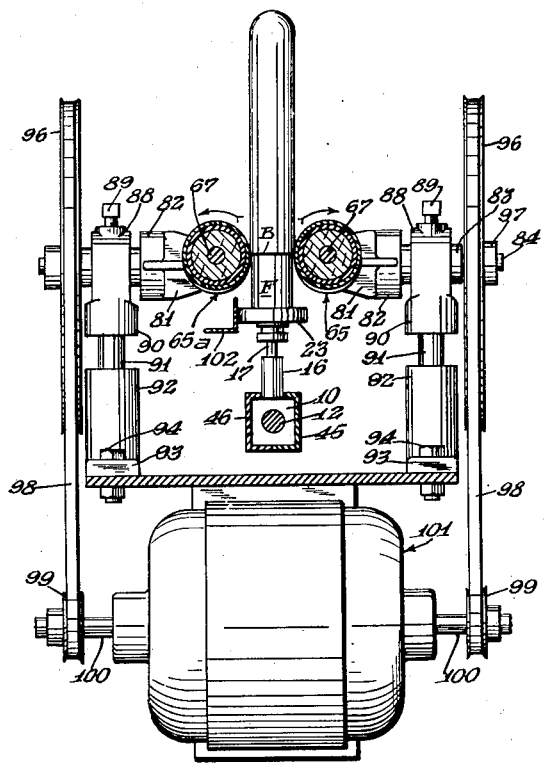

Fig. 18 is a sectional view on the line 18—18 of Fig. 15.

Figure 19:
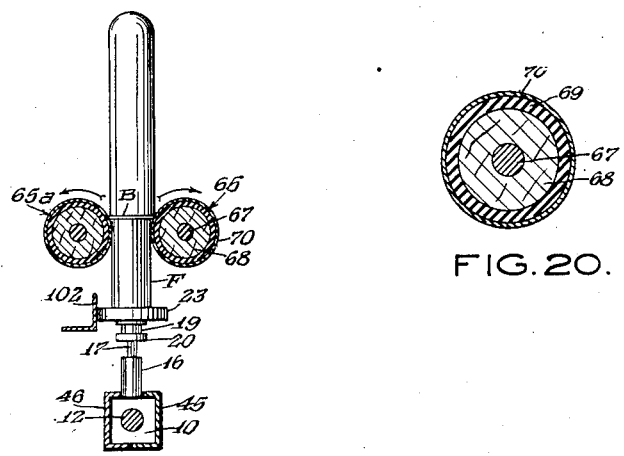

Fig. 19 is a sectional view on the line 19—19 of Fig. 15.

Figure 20:
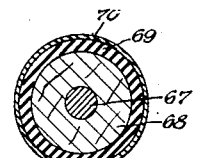

Fig. 20 is a sectional view on the line 20—20 of Fig. 15.

Fig. 21 is a side view taken in the direction of the arrow which is designated by the reference numeral 21 in Fig. 1.

Fig. 22 is a sectional view on the line 22—22 of Fig. 21.

Fig. 23 is an end elevation of Fig. 21, taken at the right-hand side of Fig. 21.

Figure 25:
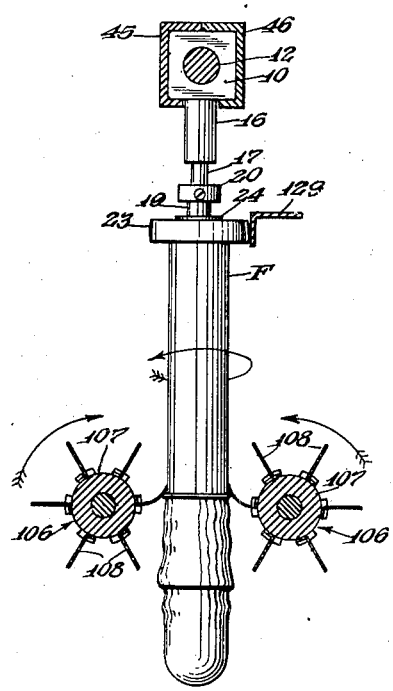
Figure 24:
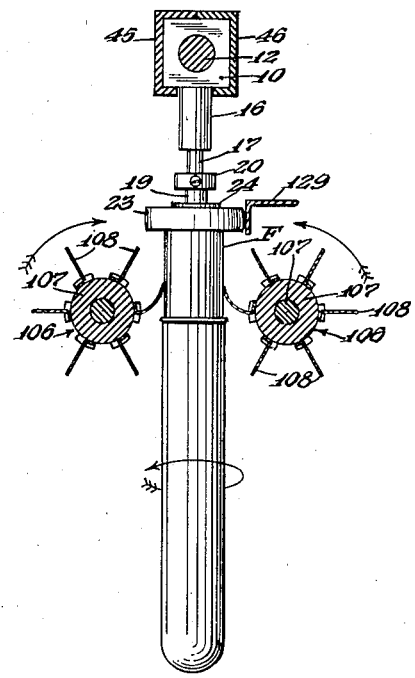

Figs. 24 and 25 are respectively sectional views on the lines 24—24 and 25—25 of Fig. 21.

Figure 26:
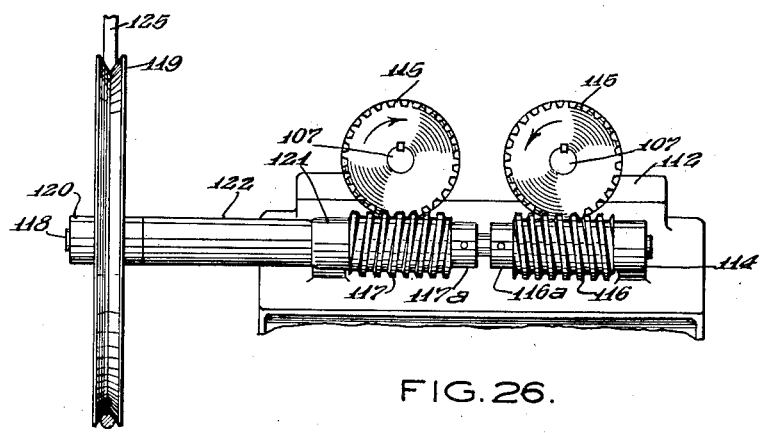

Fig. 26 is an end elevation of a part of the drive mechanism, taken in the direction of the arrow which is designated by the reference numeral 26 in Fig. 21.

Fig. 27 is a side elevation which shows the stripping mechanism, and the means for rinsing the forms, after the rubber objects have been stripped from the forms.

Fig. 28 is a sectional view on the line 28—28 of Fig. 27.

Figs. 29 and 30 are respectively sectional views on the lines 29—29 and 30—30 of Fig. 27.

Fig. 31 is a partial view which is generally similar to Fig. 19, showing a different type of covering means in the beading rolls.

Fig. 32 is a front elevation of one of the improved beading rolls which is illustrated in Fig. 31.

Fig. 33 is an end view of Fig. 32.

Fig. 34 is an enlarged sectional view on the line 34—34 of Fig. 32.

As shown in Fig. 5, a motor M, which may be an electric motor of any suitable type, is connected by means of a conventional flexible coupling 1 to a shaft 2. The horizontal shaft 2 is connected to a vertical shaft 3, by means of conventional reduction gearing which is located in a gear box 4. The shaft 3 is provided with a gear 5, which meshes with a larger gear 6 on the shaft 7. At its upper end, the vertical shaft 7 is provided with a sprocket 8, which is shown in detail in Figs. 10 and 11. The flange of the sprocket 8 is provided with a circumferential recess, thus providing spaced top and bottom walls which are cut so as to provide superposed pairs of teeth 9. An endless conveyor is driven by means of the sprocket 8. In this embodiment, the endless conveyor is in the form of a chain which consists of pivoted links. This chain is shown in detail in Fig. 9. One of its ends meshes with an idler sheave which is similar to sprocket 8. The conveyor has straight runs between sheave 8 and said companion idler sheave. This chain comprises a series of spaced blocks 10, each of which is of hollow transverse square cross-section. The square cross-section of block 10 is shown in Fig. 7. Each of these blocks 10 is provided with a central longitudinal cylindrical bore. A yoke 11 is associated with each block 10. Each yoke 11 is connected to a cylindrical bearing member 12, which is located turnably in the central cylindrical bore of the respective block 10, this being the left-hand block in Fig. 9. Each bearing member 12 is provided with a projection 14 which is pivotally connected to the arms of the adjacent yoke 11, by means of a pivot pin 15, whose inner end is threaded. This inner end engages the tapped opening of the corresponding arm of the yoke 11. Therefore each yoke is free to turn around the longitudinal axis of the bore of the respective block 10, and each yoke is free to turn about the respective extension 14, relative to a transverse axis which is perpendicular to said longitudinal axis. Each block 10 fits fairly snugly between the head of one adjacent yoke 11, and the arms of the other adjacent yoke, so that each block 10 is held against substantial longitudinal movement relative to the respective bearing member 12. As shown in Fig. 7, each block 10 is provided with an integral lateral extension 16. As also shown in Fig. 7, each extension 16 is provided with a recess in which the spindle shank 17 of a form-support is held detachably by means of a clamping screw 18. A sleeve 19 is turnably mounted upon each shaft or spindle 17. The sleeve 19 is held against longitudinal movement, relative to its spindle 17, by means of collars 20 which are clamped to the spindle 17 by means of clamping screws 21. A sleeve 22, which is provided with an integral roll 23, is mounted upon the sleeve 19. The sleeve 22 and roll 23 are made of resilient vulcanized rubber or other suitable resilient material. The ends of the sleeve 22 are located between the washers 24 which are fixed, either permanently or detachably, to the sleeve 19. The form F is made of glass or other suitable material and is connected to the rubber sleeve 22, by means of a drive fit or in any other suitable manner. As shown in Fig. 8, the outer wall of each sleeve 22 is provided with longitudinal ridges, which facilitate the connection between each sleeve 22 and its form F, by means of a tight or drive fit.

An additional sleeve 25, which is also made of resilient vulcanized rubber, is connected to sleeve 19 by cementing or the like. A washer 26 may be permanently or detachably connected to the sleeve 19, in order to prevent the sleeve 25 from shifting relative to the sleeve 19, in one direction. The interior cylindrical wall of the form F also fits snugly upon the sleeve 25, which is also provided with longitudinal ridges.

At the sprocket 8, the blocks 10 are located between the pairs of teeth 9 of said sprocket. In effect, said blocks 10 mesh with the pairs of teeth 9, so that sprocket 8 drives the endless chain conveyor.

Referring to the right-hand side of Fig. 1, the front end of the machine is provided with an idler sheave 27, which is provided with the same type of circumferential recess as the sprocket 8. The sheave 27 is not provided with the teeth 9, although it could be provided with such teeth and be generally identical to the sprocket 8, if this is desired.

Figure 14:
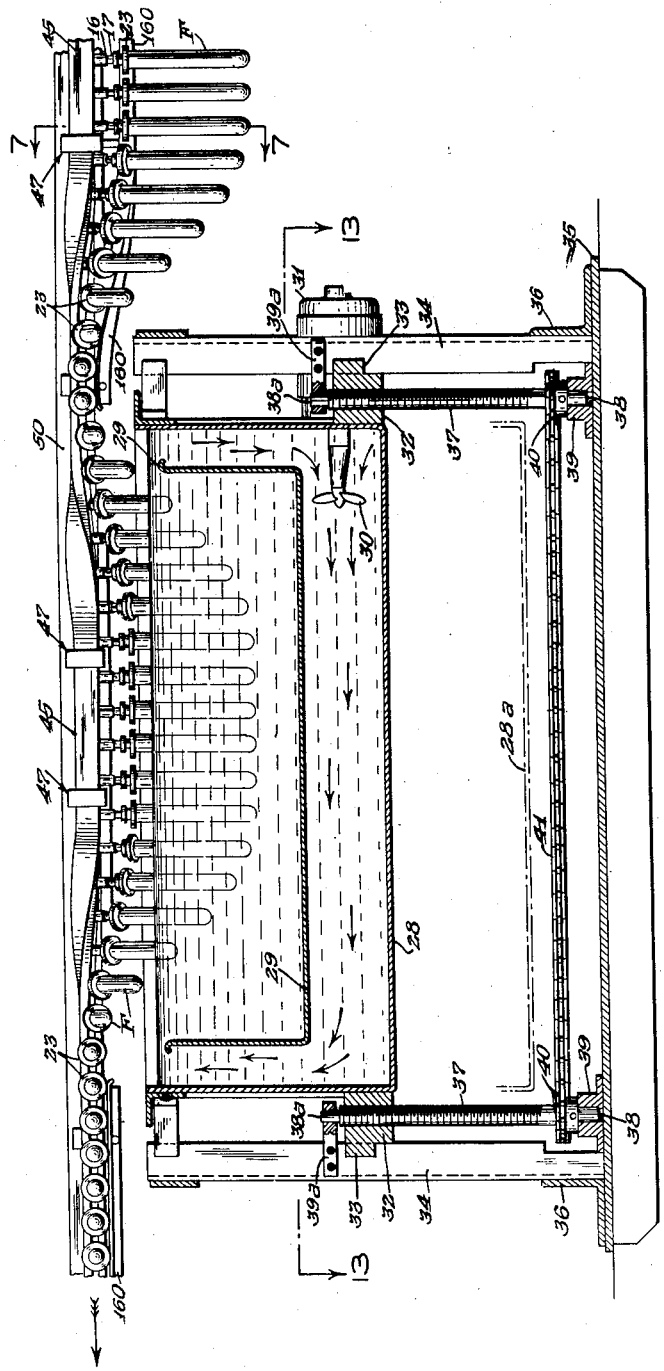
Fig. 14 is a sectional view on the line 14—14 of Fig. 12.

The first operation is to dip the forms into the tank 28, which contains latex or other suitable dispersion or solution of rubber or other suitable film-forming material. This tank 28 is shown in detail in Fig. 14. This tank 28 is provided with a partition 29, which is connected to and held spaced from the inner wall of the tank 28 in any suitable manner. The width of the partition 29, in a direction perpendicular to the plane of Fig. 14, is equal to the width of the tank 28. The machine is provided with a propeller 30, which is actuated by a motor 31. The latex or other dispersion of solution of the rubber is thus circulated in the direction of the arrows which are shown in Fig. 14, or in a direction opposite to said arrows, between the inner wall of the tank 28 and the partition 29. The normal level of the latex is above the top of the upright walls of the partition 29.

The tank 28 has lugs 32 connected thereto. These lugs 32 are provided with extensions 33, which fit slidably in the vertical guide spaces between pairs of angle irons 34. These angle irons 34 are connected to the base plate 35 of the machine by means of transverse angle bars 36.

The tank 28 can be raised and lowered by means of screws 37, whose extensions 38 are mounted in suitable bearings 39. The screws 37 are provided with sprockets 40, which are connected by a chain 41.

As shown in Figs. 12 and 13, the chain 41 passes around an actuating sprocket 42, whose vertical shaft 44 is provided with a hand wheel 43.

The upper ends of the screws 37 are located in corresponding tapped openings of the lugs 32. The upper ends of the screws 37 are also provided with reduced extensions 38a which are located turnably in fixed bearing members 39a.

Therefore, by actuating the hand wheel 43, the bottom of the wall of the tank 28 can be lowered to the broken line 28a which is shown in Fig. 14.

Therefore, at the end of a day's run, the tank 28 can be lowered so that the adjacent forms are wholly separated from the latex. This facilitates cleaning and other operations, such as replacing defective forms or the like. The tank 28 can be thus lowered without stopping the operation of the machine.

The blocks 10 move slidably between stationary rail members 45 and 46, which are shown in cross-section in Fig. 7. These rail members 45 and 46 are supported at spaced intervals by means of angle irons 47, to which bars 48 are respectively connected by means of screws 49. The angle irons 47 are connected to the fixed frame 30 of the machine by means of screws 51. Each supporting member 47 and a supplemental bar 48 form in effect a U-shaped supporting member. The rail members 45 and 46 are held between the angle irons 47 and bars 48 by screws 52 and 53. A spacing bar 54 is provided between the rail member 46 and the adjacent portion of the member 47. Another spacing bar 55 is provided between each bar 48, and the adjacent portion of the rail member 45. These spacing bars 54 and 55 are welded or otherwise secured respectively to the members 46 and 46. The screws 52 and 53 respectively pass through tapped holes of the spacing members 54 and 55. The members 45 and 46 are provided in sections, and a supporting member 47, together with its bar 48, are provided at the junction between two successive sections. The spacing bars 54 and 55 are welded to the successive rail members 45 and 46 at each junction, as indicated at W in Fig. 9. The projection 16 of the blocks 10 extend through the openings between the adjacent flanges of the rail members 45 and 46. The bars 48 may be omitted at some of the junctions of the rail members 45 and 46, and the rail members may be connected in any suitable manner to each other and to their supports.

The rail members 45 and 46 are twisted so as to turn the forms into the desired positions relative to the vertical plane. For example, and as indicated in Fig. 2, the rail members 45 and 46 are shaped so that the forms F are held inverted relative to the chain conveyor, at the right-hand side of the first dipping tank 28. As indicated in Fig. 2, the rail members 45 and 46 are twisted so that the forms F are substantially horizontal as they pass above the front or right-hand end of the tank 28, so that the forms thus clear the front end-wall of the tank 28. As shown in Fig. 2, the rail members 45 and 46 are twisted so as to invert the forms while they are partially immersed in the moving stream of latex in the tank 28, so that each form is covered to the required height with a thin film of the latex or other material. The rail members 45 and 46 are then twisted so that the forms F are substantially horizontal as they pass over and clear the rear end-wall of the tank 28. The forms are then held horizontal while they are passed through a drying tunnel 56. As shown in Fig. 4, this tunnel 56 is internally heated by means of pipes 57, through which steam or other heating medium is passed from any suitable source, which is not shown. The rear end of the tunnel 56 is provided with an enlargement 58 in which a blower fan 59 is located. This fan is operated by motor 63. This blower fan forces the air from the rear end of the tunnel 56 out through the front end thereof so that the direction of the current of heated air is counter to the direction of the movement of the forms through said tunnel. Each film of rubber is thoroughly dried in the tunnel 56 so that the forms are now ready for their second dip. The latex dispersion may be of the prevulcanized type. However, the period during which the forms pass through the first tunnel is too short to completely vulcanize the dried films of rubber. Said films are substantially or wholly unvulcanized, or only partially vulcanized in the first tunnel 56. The thickness of the latex film which is produced by the first dip in tank 28 is about 0.001 inch, and the thickness of the film in the second dip in the next tank is about 0.0015 inch, making a total thickness of 0.0025 inch. This can be varied as desired. If desired, the latex dispersion may be unvulcanized and it may have a vulcanizing agent and a suitable accelerator or accelerators.

The forms are given their second dip in a second tank 60, which is identical in all respects with the tank 28. The tank 60 can be lowered by mechanism which is identical with the mechanism which is used for lowering the tank 28. It is therefore sufficient to state that the hand wheel 43a is identical with the hand wheel 43 and that the screws 37a of the tank 60 are identical with the screws 37. The rail members 45 and 46 are twisted in the manner previously described, so that the operation of producing the second dip is identical with that of producing the first dip. After the forms have been given their second dip, they pass, in the inverted position, over a drip tank 61. Surplus rubber then drops off the forms while the forms pass over this tank 61, in which the surplus rubber is accumulated. The forms are then passed in the horizontal position through a second drying tunnel 62, which is identical with the first drying tunnel 56. The motor 63a is identical with the motor 63 and the fan 59a is identical with the fan 59.

The second tunnel 62 is provided with internal heating means which are identical with the pipes 57. The rubber films which leave the second tunnel are also incompletely vulcanized, so that the beads which are subsequently formed will adhere to the bodies of the rubber films.

The next operation is to bead the rubber articles. Prior to said beading, the bottom end-portions of the rubber objects may be moistened, by steam which is delivered from a boiler in which the steam is at a pressure of about 75 lbs. per square inch through the perforated pipes 150 and 151, in order to loosen said end-portions of the rubber objects from the glass forms. Water or other moistening agent, or fluid, which may be a liquid or a vapor, at ordinary temperature of 70° F. could be used for moistening and loosening said end-portions. The steam heats the rubber, but since the latex film is not completely vulcanized, said film readily absorbs moisture. The moistening effect overcomes any tendency of the rubber to stick to the glass form even though the latex film is heated. This facilitates the separation of the inner end-portion of the rubber film from the smooth glass form, during the beading operation. The beading mechanism comprises a first pair of beading rollers 65 and 65a, and a second pair of beading rollers 64 and 64a. The direction of movement of the conveyor is indicated by the arrow 66 in Fig. 5. These pairs of beading rollers are identical and only one pair is used during the operation of the machine. The other pair is used only if the first pair becomes inoperative. As shown in Figs. 15–20, each of the beading rollers is of cylindrical shape. Each roll comprises a spindle 67, which can be made of steel or other suitable material, and a core 68 which is rigidly fastened to the spindle 67. The core 68 is made of wood or other suitable material. Each core 68 is provided with a sleeve 69 which is made of any suitable material, such as resilient vulcanized rubber. This may be vulcanized sponge rubber, which is soft and resilient. This rubber may be soft and resilient or non-spongy rubber. Each rubber sleeve 69 is covered by a sleeve 70, which is preferably made of tanned leather, in order to provide each beading roller with a smooth and durable beading surface. As shown in Figs. 15-20, each leather sleeve 70 comprises a strip of leather which is helically wrapped so as to provide a smooth and continuous covering. The rubber sleeve 69 is securely connected to the core 68, as by cementing or the like, and the leather strip can be cemented or otherwise securely connected to the rubber sleeve 69.

As shown in Fig. 15, each beading roller is mounted at an angle to the axes of the forms which are located in the beading zone. The axes of the forms are preferably vertical, while the forms are located in the beading zone. Each shaft 67 extends beyond the ends of the respective beading roller, and each shaft 67 is provided with reduced cylindrical end-extensions 67a.

Referring to Fig. 15, the upper extension 67a of each inclined shaft 67 is turnably mounted in a bearing 71. Each bearing 71 is laterally adjustable, so that the lateral distance between a pair of beading rollers can be regulated. As shown in Fig. 16, each bearing 71 is provided with a lateral stud 72 which is slidable in a sleeve 73. As shown in Fig. 15, each sleeve 73 has a depending extension 73a, which is provided with a cylindrical stud 74. Each cylindrical stud 74 is vertically adjustable in a vertical sleeve 75, whose base 76 is connected by screws 77 to the frame of the machine. A clamping screw 78 holds the respective cylindrical stud 74 in its vertically adjusted position. Another clamping screw 79 holds the respective lateral cylindrical stud 72 in its laterally adjusted position. The lower cylindrical extension 67a of each shaft 67 passes through a sleeve-bearing 80 which is part of a bracket 81. Each bracket 81 is provided with a hollow boss 82. Each boss 82 is provided with a reduced extension 83. A shaft 83 passes through each boss 82 and its extension 83. The hub 85 of a bevel gear 86 is keyed or otherwise rigidly connected to each shaft 84. Each bevel gear 86 meshes with a bevel gear 87 whose hub is keyed or otherwise suitably connected to the adjacent extension of the shaft 67. Each boss extension 83 can be laterally adjusted. For this purpose, each boss-extension 83 is located slidably in the bore of a sleeve or collar 88, and a clamping screw 89 maintains the respective boss-extension 83 in its laterally adjusted position. Each collar 88 can be vertically adjusted. For this purpose, each collar 88 is provided with an integral extension 90 which has an integral cylindrical stud 91. Each stud 91 is located movably in the bore of a vertical sleeve 92 whose base 93 is connected to the frame of the machine by screws 94. A clamping screw 95 holds each member 91 in its vertically adjusted position. Hence the shaft of each beading roller can be both vertically and laterally adjusted at each of its ends.

Each of the shafts 84 which are associated with the respective beading rollers, is provided with a drive pulley 96. Each pulley 95 is provided with a hub 97 which is rigidly and detachably connected to the adjacent portion of the respective shaft 84. As shown in Figs. 15 and 18, each pulley 96 is provided with a drive belt 98, which passes around a smaller pulley which is mounted upon the shaft 100. Each pair of beading rollers is associated with a common drive shaft 100, which is driven by means of a motor 101.

The beading rollers are rotated in opposite directions. It is necessary to turn each form around its own axis in the beading zone, in order that the beading rollers may form the bead B at the inner end of the rubber object. For this purpose, the machine is provided in the beading zone with a stationary angle iron 102. Angle irons similar to said angle iron 102 are provided in other parts of the machine, where it is desired to rotate the forms around their respective axes. The rolls 23 of the respective forms contact with the angle iron 102 in the beading zone, so that each form is turned continuously and with proper speed in the same direction, during the beading operation. Since the beading rollers are inclined to the axes of the forms during the beading operation, the formation of the bead B is progressive, and said bead is completed at the upper ends of the beading rollers.

After the beading operation has been completed, the forms with the rubber objects thereon are passed through an additional heating tunnel 103. This heating tunnel 103 is identical with the heating tunnels previously described, and it is provided with a blower fan 104, which is actuated by motor 104a. The direction of the current of heated air in the tunnel 103 may be in the same direction as the movement of the forms, or counter to the direction of the movement of the forms. This applies to the other heating tunnels since the current of heated air may move in the same direction or opposite to the direction of movement of the forms. The function of this heating tunnel 103 is to drive off traces of moisture from the beads, and to ensure the complete vulcanization of the bodies and the beads of the rubber objects, so that the beads are vulcanized integrally to the bodies.

The axes of the forms are maintained vertical in the heating tunnel 103, whereas the axes of the forms are maintained horizontal in the previously mentioned heating tunnels. The temperature in the heating tunnel 103 may be about 300° F. and the same temperature may be maintained in the previously mentioned heating tunnels. However, due to the evaporation of the water of the latex in the first two heating tunnels, the temperature of the forms and of the rubber films thereon is less than 300° F. in the first two heating tunnels. The temperature of the hollow glass forms and of the rubber films thereon, is about 150° F. to 160° F. in the first two tunnels, although this may vary. Each form passes through the first heating tunnel in about two minutes, through the second heating tunnel in about 1.5 minutes, and through the third heating tunnel 103 in about three minutes. This is controlled by the speed of the machine and the lengths of the respective tunnels, and the speed of the machine is varied according to the humidity of the atmosphere. Each tunnel receives about 6,000 cubic feet of air per minute. The respective lengths of the successive tunnels may be 50 feet, 35 feet, and 70 feet.

The next operation is to loosen the completed rubber objects from their forms, in order to facilitate the stripping of said objects from the forms. For this purpose, the forms, with the rubber objects thereon, are dipped into a tank 105 which contains a solution of soap and trisodium phosphate in water, at a temperature of about 110° F.–120° F. This operation is well-known per se.

The rail members 45 and 46 are twisted in the manner previously mentioned in order to enable the forms to clear the rear end-wall of the tank 105, and then to invert the forms so that the rubber objects thereon are entirely immersed in the foresaid solution, the forms are thus turned through an angle of 180° after they leave the tunnel 103, in order to immerse the rubber objects in the liquid in the tank 105. Each form passes through the tank 105 during a period of 60 seconds.

The next operation is to strip the rubber objects from the forms.

The machine is provided with a pair of stripping rolls 106. Each of these rolls is made of wood, and it is rigidly connected to a steel shaft 107. Each roll 106 is provided with a series of flaps 108 which are flexible. These flaps are made of layers of fabric and vulcanized rubber in the usual manner. These flaps 108 have sufficient inherent stiffness so as to maintain them normally in the flat condition, but said flaps can bend laterally when they contact with the form, as shown in Figs. 24 and 25. Each flap 108 is a planar strip.

As shown in Fig. 21, the forms are inverted during the stripping operation, and the shaft of each stripping roll is inclined to the axes of the forms which are located in the stripping zone. As shown in Fig. 21, the upper end of each shaft 107 passes through a bearing 109, which is rigidly connected to a support 110, which is connected to the frame of the machine by means of screws 111. The lower end of each shaft 107 is located in a bearing 112, whose extension is rigidly connected to the frame of the machine. The bearing 112 is associated with a second bearing 114, which is integral with an extension of the bearing 112. The bearings 112 and 114 preferably form part of a common casting. For assembly purposes, each bearing which is provided herein may be made in the conventional manner from two semi-cylindrical parts, which can be detachably connected to each other.

Each of the shafts 107 is provided with a worm gear 115, as shown in detail in Fig. 26. The worm gears 115 are rotated in opposite directions by the right and left worms 116 and 117, which are mounted upon the shaft 118. The shaft 118 is provided with a drive pulley 119, whose hub 120 is keyed or otherwise rigidly connected to the shaft 118. The worms 116 and 117 are respectively provided with hubs 116a and 117a which are clamped or otherwise suitably connected to the shaft 118. The shaft 118 also passes through bearings 121 and 122. Referring to Fig. 21, the pulley 119 is driven by a motor 124 by means of a belt 125. Subsequent to the stripping, the forms are rinsed by means of clean hot water and the forms are then wiped so as to remove the rinsing liquid therefrom. In the rinsing zone, the inverted forms are moved over a drip pan 126, which has an outlet pipe 127. The forms are held inverted during the rinsing operation. As shown in detail in Fig. 29, the rinsing liquid is supplied by means of perforated spray pipes 128. The forms are rotated during the rinsing operation, by means of a stationary angle iron 129. Since the forms are rotated during the stripping operation, this angle iron 129 also extends into the stripping zone. The spray pipes 128 are provided with inlet pipes 130 which are controlled by means of hand valves 131. The spray pipes 128 are mounted upon a casting 132, which is connected to the bottom wall of the drip pan 126. The spray pipes 128 are clamped to the top of said casting by means of clamping heads 133, and screws 134.

A single wiping roll 135 is provided. This has planar fabric-rubber strips 136, of the same type which are used on the stripping rolls. The shaft 137 of the wiper roll 135 is located at an angle to the axes of the forms, which are maintained inverted during the wiping operation. The ends of the shaft 137 are mounted in suitable bearings 138 and 139. One end of the shaft 137 is provided with a worm gear 140, which meshes with a worm 141 on a shaft 142. Said shaft 142 is provided with a pulley 143 which is actuated by a motor 144, by means of a belt 145. The angle iron 129 is also located in the wiping zone, so that the forms are rotated about their respective axes during the wiping operation. The liquid which is wiped from the form drips into the pan 126.

The forms are also turned around their respective axes while they are passed through the heating tunnels, and for this purpose angle irons 160 are provided in the respective heating tunnels.

The forms are continuously rotated about their respective axes during all the operations of the machine, save when the forms are dipped into the latex or other material. During such dipping, when the films of latex are deposited upon the forms, said forms are preferably not rotated about their respective axes.

One of the principal features of the invention is to moisten the outer end-portions of the rubber objects and also to soften the same, prior to the beading operation, in order to facilitate the beading operation.

The embodiment of Figs. 31-34 shows a novel type of woven or braided covering for the beading rolls. Each beading roll is provided with a shaft 67 and a wooden core 68 and a resilient sleeve 69, which is made of vulcanized rubber, as in the first embodiment. The covering for each rubber sleeve 69 consists of longitudinal strips 163 and of a circumferential strip 162 which is wound helically and which is interlaced or interwoven with the longitudinal strips 163. In order to assemble these strips, the end-portion of each longitudinal strip 163 is bent laterally, thus providing an extension 163a which is connected to the respective end-face of the wooden cylinder 68, by means of a respective nail 164. The helical strip 162 is then progressively interwoven or braided with the longitudinal strips 163, so that the helical strip 162 passes successively under and over the longitudinal strips 163, as illustrated in Fig. 34. The longitudinal strips 163 are connected at intervals to the rubber cylinder 69 by means of nails 165 which penetrate the rubber cylinder 69 and which may be long enough to penetrate the wooden cylinder 68. These nails 165 are covered by the superposed portions of the helical strip 162. The helical strip 162 is also connected to the rubber cylinder 69 by means of nails 165a which are respectively located underneath respective longitudinal strips 163. These nails 165a may also be of sufficient length to enter the wooden cylinder 68. Each end of each longitudinal strip 163 is provided with a laterally bent extension 163a. The helical strip 162 is therefore successively interwoven with the longitudinal strips 163, from left to right, and after the interweaving has been completed, the right-hand extensions 163a can be nailed to the right-hand end-face of the cylinder 69 or the cylinder 68. Other fastening means may be employed, but the use of nails or other rigid fastening means is preferred, as this is superior to the use of cement, although cement may also be employed.

The strips 162 and 163 may be made of natural tanned leather or artificial leather or of any suitable material which is resistant to the action of the latex and which is also water-repellent and impervious to water. The strips 162 and 163 may be of substantially the same width, and the width of each strip can be from ⅜ of an inch to ½ inch.

The rail members 45 and 46 have a common and straight longitudinal axis. The endless conveyor has two straight runs and two curved end-runs. Said curved end-runs pass around the members 8 and 27. The rail members 45 and 46 are located only at the straight runs of the endless conveyor.

The blocks 10 may be of any suitable non-circular or polygonal contour, so as to provide large bearing surfaces which slidably abut the corresponding inner surfaces of the rail members 45 and 46. Therefore, while it is preferable to provide the outer surfaces of the blocks 10 with square cross-sections, the invention is not limited thereto.

The members 45 and 46 therefore constitute a guide through which a straight run of the endless conveyor is actuated. The inner surface of said guide has a plurality of planar faces. Blocks 10 are form supports, to which the forms F are turnably connected, and said forms F extend laterally relative to said guide. Said guide is twisted relative to its straight longitudinal axis so as to vary the inclinations between the axes of said forms, and a predetermined reference plane. This plane may be the horizontal plane or the vertical plane. Whenever I refer, in the claims, to the polygonal inner surfaces of the guide, I include any non-circular shape. Therefore, if the inner surface of the guide has only a single planar surface, this is within the scope of the invention.

In order to economize space the axes of the forms are turned relative to a predetermined reference plane, in both straight runs of the endless conveyor. The invention is not limited thereto, as the members 45 and 46 can be located wholly along a single straight run of the endless conveyor.

The members 16 constitute means for connecting the forms to the form supports 10. These members 16 extend through a slot of the guide. Said slot does not have a straight longitudinal axis, since said slot is shaped in accordance with the tilting of the axes of the forms, relative to the predetermined reference plane. The members 16 have a substantial clearance in the slot of the guide, since the tilting of the axes of the forms is produced primarily by the snug sliding fit of the planar face or faces of the block 10, against the planar face or faces of the interior surface of the guide.

It will be noted that while the axes of the forms are tilted, the blocks 10 are not turned relative to the respective adjacent portions of the inner surface of the guide.

For convenience the guide is designated as being twisted. In actual practice, the rail members 45 and 46 are cast or otherwise made initially in their final form, save that they are machined or otherwise finished, subsequent to the casting.

While I prefer to form the rubber objects on the forms F by using a latex dispersion, I can use other solutions or dispersions of rubber. I prefer to use a latex dispersion in forming the rubber objects upon the forms F, because latex which has not been completely vulcanized absorbs moisture more readily than a rubber film which has been secured by using a solution or dispersion of rubber in gasoline or the like.

However, the invention is not restricted to the use of a rubber film which has been formed from a latex dispersion. Rubber which is theoretically wholly vulcanized can also absorb moisture, for the purposes of my invention. For example, I can use the so-called pre-vulcanized rubber stock because while this is theoretically wholly vulcanized, it is, in fact, sufficiently unvulcanized to take up moisture. Therefore, I can use the pre-vulcanized latex, in which the rubber particles have been vulcanized in the dispersion. In such case the protein or other constituents of the latex can absorb sufficient moisture for the purposes of the invention.

The invention also includes the use of artificial dispersions of rubber in which water or other liquid medium is the outer phase. The invention also includes the use of rubber substitutes and the various synthetic rubbers, such as "Neoprene," "Perbunan," "Buna" and the like.

Whenever I refer to "beading" in the description or claims, I refer to it generally as the formation of a thickened or reinforced zone at an end of the rubber object. In this particular case, the object is padded at its inner or open end.

The rail members 45 and 46 can be made from standard steel tubing which is of rectangular or square or other suitable polygonal cross-section. This steel tubing is cut longitudinal, in order to separate the same into longitudinal halves. The edges can then be twisted by cold working. These sections of the steel tubing are preferably twisted separately into the desired shape.

Fig. 6 shows how the forms are passed through a drying tunnel 62 which has an enlargement in which a blower 59a is located. Said blower is operated by an electric motor 63a.

I have shown preferred embodiments of my invention, but it is clear that numerous changes and omissions can be made without departing from its spirit.

This application is a division of my application Serial No. 358,231, filed September 25, 1940, which has been issued as U. S. Patent No. 2,322,766 on June 29, 1943.

I claim:

1. A machine of the class described, comprising a beading roll having a resilient face and a covering for said resilient face, said cover comprising spaced longitudinal strips which are interwoven with a circumferential helical strip so as to provide a substantially continuous beading face for said beading roll.

2. A machine of the class described, comprising a beading roll having a resilent face and a covering for said resilient face, said cover comprising spaced longitudinal strips which are interwoven with a circumferential helical strip so as to provide a substantially continuous beading face for said beading roll, said longitudinal strips being connected to the beading roll by fastening means which are covered by said helical strip, said helical strip being connected to the beading roll by fastening means which are covered by the respective longitudinal strips.

3. In the art of making a rubber object which is beaded at an end thereof, those steps which consist in forming said object upon the form, moistening the portion of said object which is to be beaded before the rubber at said portion has been completely vulcanized, beading said portion of the object, and then drying the moistened beaded portion of the object and completing the vulcanization thereof by means of heat.

FREDERICK J. MAYWALD, Jr.